Sept. 16, 1969   P. W. GORE ET AL   3,467,412

HOSE SPLICE

Filed Aug. 14, 1967

INVENTOR.
PHILIP W. GORE
LAWRENCE R. JONES

R. H. Hatton
ATTORNEY

United States Patent Office 3,467,412
Patented Sept. 16, 1969

3,467,412
HOSE SPLICE
Philip W. Gore, Tallmadge, and Lawrence R. Jones, Cuyahoga Falls, Ohio, assignors to The Goodyear Tire & Rubber Company, Akron, Ohio, a corporation of Ohio
Filed Aug. 14, 1967, Ser. No. 660,308
Int. Cl. F16l *31/00, 35/00*
U.S. Cl. 285—293           2 Claims

ABSTRACT OF THE DISCLOSURE

An improved hose splice construction for joining two or more segments of previously vulcanized flexible fabric reinforced hose. The splice includes a tapered joint uniting the inner tubes of the hose segments and unvulcanized elastomeric strips and plies of rubber-covered splicing fabric to form a bond between the textile fabric reinforcing body plies and the outer flexible covers of the hose segments being united. This arrangement may be used to form long lengths of both heavy duty and lightweight hose structures and also provides a splice construction which may be severely flexed and bent without causing the splice to leak.

BACKGROUND OF THE INVENTION

This invention relates to hose splices for joining several segments of flexible hose and more specifically, to an improved hose splice for a fabric-reinforced hose.

The usual practice followed in manufacturing flexible fabric-reinforced hose is to assemble on a hollow cylindrical mandrel the various materials which make up the hose structure. The usual materials for this purpose are an inner tube of uncured or unvulcanized rubber or rubber-like material, a number of plies of textile fabric which are impregnated with uncured rubber, and an outer unvulcanized rubber cover. These materials are then cured or vulcanized by means of heat and pressure. The usual length of the mandrel is approximately 50 feet due to the fact that this is the length of the generally available vulcanizing equipment. Accordingly, each hose section or segment is made in this length although other lengths can be made depending upon the available equipment. In most instances, if longer lengths are desired, the segments are joined together by means of metal couplings attached to the ends. This assembly has the disadvantage of being susceptible to leakage between the couplings and the hose in addition to being a cumbersome and difficult arrangement to handle.

It has been found that hose splices using textile fabric impregnated with uncured rubber as inner linings to form a bond between hose sections have reduced or eliminated many of these problems. For example, Galloway United States Patent No. 2,930,406 discloses a splice of this type for heavy duty discharge hose in which the ends of the inner tubes of the hose sections are joined in abutting end-to-end relationship. (The corresponding method patent is United States Patent No. 3,053,724.) However, this arrangement has the admitted disadvantage of permitting seepage of certain liquids contained in the hose which impairs the bond between the rubber and the fabric. Rittenhouse United States Patent No. 3,100,659 was issued as an improvement patent to Galloway and discloses a mass of unreinforced elastomeric material and elastomer impregnated fabric strips embedded in this mass to prevent seepage. Both of the splices disclosed by the previously mentioned patents are primarily for the purpose of joining sections of heavy duty discharge hose and are not specifically adapted nor are they suitable for uniting hose of lightweight construction.

It is desirable to provide a splice construction which will satisfy the requirements of both heavy duty and lightweight conduits. The splice construction of the present invention, as hereinafter described, accomplishes this purpose without additional expense and results in a much more reliable bond between hose segments which will endure considerably more flexing and bending than previously used splices.

The principal feature of the present invention is a tapered joint connecting the inner tubes of each hose segment to be spliced. In this way, failures in the splice area are minimized by providing a greater contact surface between the inner tubes and lessening the strain per unit area on the joint when the hose is bent or flexed. The contact surface is therefore not dependent upon the gauge of the inner tubes as is the situation when the tubes are joined in an end-to-end relationship. Also, the areas subject to the stresses causing possible separation are distributed axially along the splice area thus minimizing the possibility of failure as compared to the abutting type of splice. Other features, such as the utilization of strips and layers of unvulcanized elastomeric gum and individual plies of splicing fabric, also help provide a superior bond within the splice structure. The resulting hose splice construction has strength equal to or greater than the individually cured hose segments.

OBJECTS OF THE INVENTION

A primary object of this innvention is to provide a means of uniting, without the use of metal end couplings, lengths of both heavy duty and lightweight flexible hose into significantly longer lengths that cannot be manufactured on conventional hose building equipment.

Another important object of this invention is to provide an economical improved hose splice construction with strength equal to or greater than the hose proper which will withstand severe flexing and bending and prevent leakage of the contents of the hose.

Another object of this invention is to provide an improved hose splice construction in which the contacting surfaces between the inner tubes of the hose segments are not dependent upon the gauge of the inner tubes thereby permitting the formation of a joint of superior strength and reliability.

Other objects and advantages of this invention will become apparent hereinafter as the description thereof proceeds, the novel features, arrangements and combinations being clearly pointed out in the specification as well as the claims thereunto appended.

DESCRIPTION OF THE PREFERRED EMBODIMENT

Figure 1:
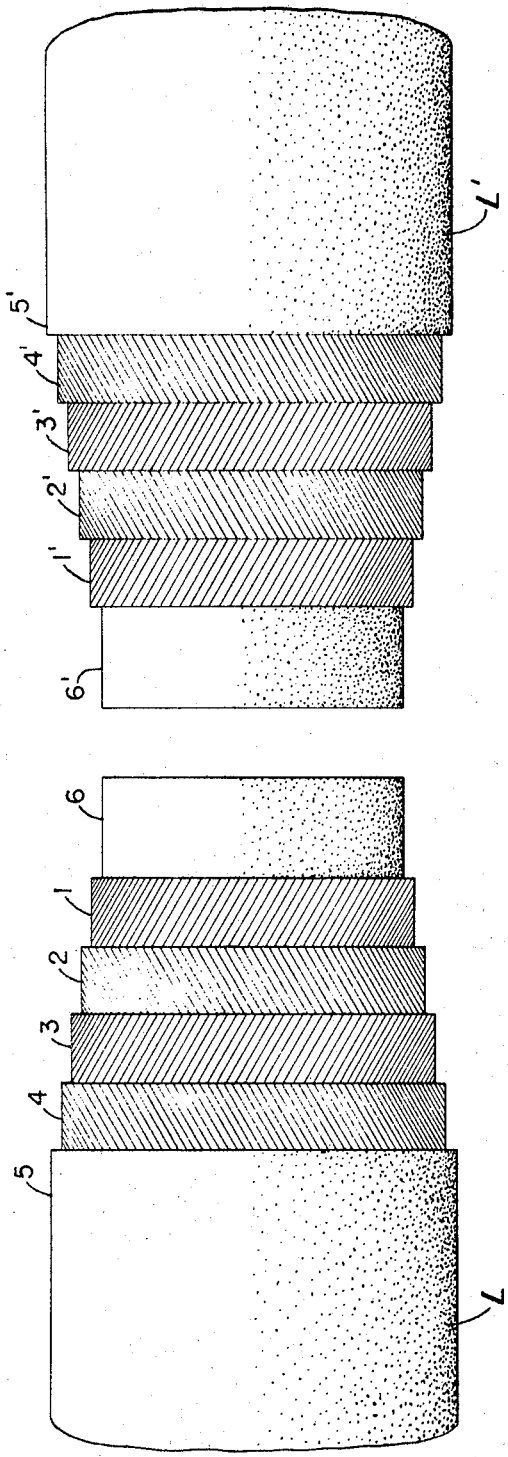
FIG. 1 is a view of the ends of two segments of hose prepared for splicing according to the present invention.

Although fabric reinforced hoses of various constructions may be spliced in the manner disclosed in this invention, the specific embodiment described is the splicing of two segments of 8 inch inside diameter water discharge hose reinforced by four plies of textile fabric. The inner tube and outer cover of the hose are composed of elastomeric material such as natural or synthetic rubber.

Referring now to the drawings:

FIG. 1 shows two previously cured hose segments L and L' preparatory to splicing. As illustrated, the end portions of the reinforcing fabric body plies 1 and 1', 2 and 2', 3 and 3', 4 and 4' are removed in such a manner that a stepped end configuration is formed in which the radially innermost body plies 1 and 1' terminate at the shortest distance from the ends of the inner tubes 6 and 6' and each succeeding body ply 2 and 2', 3 and 3', 4 and 4' terminates at a progressively greater distance from the end inner tubes 6 and 6' with the ends of the outer covers 5 and 5' terminating at the greatest distance from the ends of the inner tubes 6 and 6'. The ends of the inner tubes 6 and 6' are thereby exposed preparatory to subsequent splicing procedures.

Figure 2:
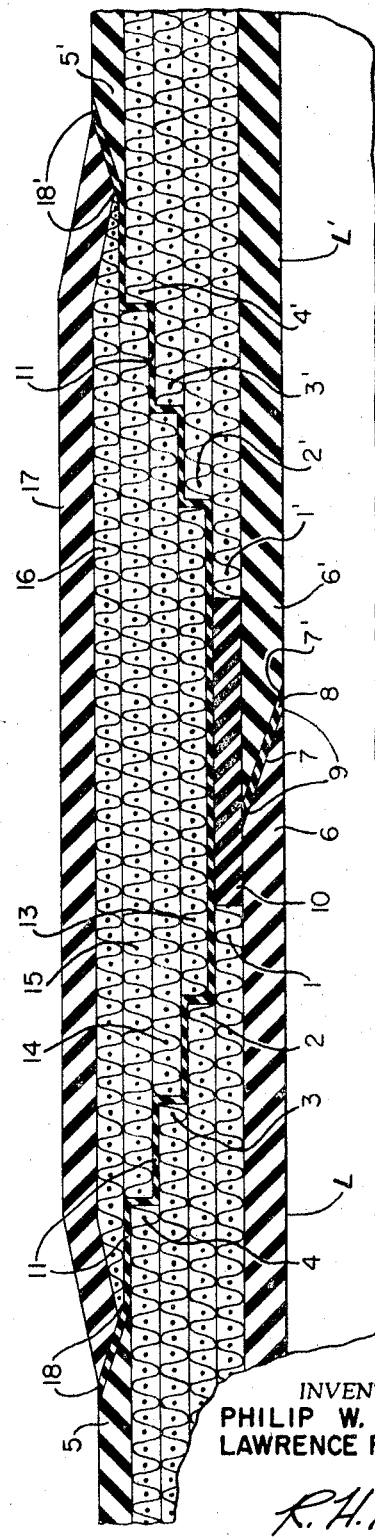
FIG. 2 is an enlarged partial sectional view showing the splice construction of the present invention.

FIG. 2 shows an enlarged partial sectional view of the finished splice construction of this invention. In order to more clearly illustrate the splice construction, the more important aspects of the splicing procedure will be hereinafter described. The exposed end 6' of the inner tube of segment L', as previously described in FIG. 1, is folded back and the inside surface is buffed to a feathered edge to form the inwardly facing tapered surface 7'. The outside surface of the end of the inner tube 6 of segment L is also buffed to a feathered edge thereby forming an outwardly facing tapered surface 7 of substantially the same angle as that of 7'. These buffed surfaces are then solvent washed and coated with suitable rubber cements. Preferably, a thin strip 8 of unvulcanized natural or synthetic elastomer is applied as a tie gum over either tapered surface 7 of inner tube 6 or tapered surface 7' of inner tube 6'. Preferably with a mandrel in the interior of hose segments L and L', the outwardly facing feathered edge 7 and inwardly facing feathered edge 7' are then joined together by unfolding the end of the inner tube 6' of segment L' so that the feathered edge surface 7' lies over feathered edge surface 7. The tapered joint 9 is formed thus uniting the inner tubes 6 and 6' of hose segments L and L'. The complete area between the ends of the outer covers 5 and 5' and inner tubes 6 and 6' is then buffed, solvent washed, and cemented to prepare for the subsequent splicing operations.

The next operation involves applying a layer 10 of unvulcanized elastomeric material as a cover layer over the tapered joint 9 extending to fill between the ends of the innermost body plies 1 and 1' in a substantially abutting relationship. As will be noted, the outer surface of the layer 10 is preferably substantially coplanar with the outer surface of innermost body plies 1 and 1'. A relatively thin unvulcanized elastomeric binder layer 11 is then applied to surround all the exposed portions of the body plies 5 and 5', 4 and 4', 3 and 3', 2 and 2' of each hose segment L and L' and unvulcanized cover layer 10 of the tapered joint 9.

Plies of uncured rubber-coated splicing fabric 13, 14, 15 and 16, preferably of substantially the same gauge and and composed of the same material as the fabric reinforcing body such as cotton or rayon duck or rayon or nylon tire cords, are then placed between the ends of body plies 2 and 2', 3 and 3', 4 and 4' and outer covers 5 and 5' respectively. As illustrated, splicing ply 13 extends between the ends of body plies 2 and 2' in abutting relationship overlapping and thus tieing together the ends of body plies 1 and 1'. Similarly, splicing ply 14 is placed between the ends of body plies 3 and 3' overlapping and tieing together the ends of body plies 2 and 2' and splicing ply 15 is placed between the ends of body plies 4 and 4' overlapping and tieing together the ends of body plies 3 and 3'. In order to attain the maximum splice strength if textile cord fabric is used, the direction and angle of the splicing ply cords should be the same as the direction and angle of the corresponding body ply cords and opposite that of the cords of the adjacent splicing plies. The outer surfaces of the splicing plies are substantially coplanar with the outer surfaces of the corresponding body plies. In addition, splicing ply 16 is placed between the ends of the outer covers 5 and 5' overlapping the ends of body plies 4 and 4' so that the outer surface of splicing ply 16 is substantially coplanar to the outer covers 5 and 5'.

A layer 17 of unvulcanized elastomeric material such as natural or synthetic rubber is then solvent washed and wrapped around the entire splice area. The longitudinal and circumferential laps formed by layer 17 should then be skived to reduce any excessive bulkiness in the splice area. It is also preferable, as shown in FIG. 2, to skive the ends of the hose segment covers 5 and 5' and form tapered joints 18 and 18' at the junction between the ends of covers 5 and 5' and the ends of the splice cover 17. The ends of the binder layer 11 may be used as a tie gum to seal the joints 18 and 18'. These joints 18 and 18' serve to prevent the entrance of moisture into the splice area which may have a detrimental effect on the various hose and splice components. As will be noted, the construction of joints 18 and 18' is very similar to that of joint 9 which connects inner tubes 6 and 6'. Finally, the components of the splice construction are bonded under heat and pressure into an integral structure having the overall length of the combined hose segments L and L'. Of course, it is to be understood that any number of such segments may be joined together as shown to form the desired length.

While certain representative embodiments and details have been shown for the purpose of illustrating the invention, it will be apparent to those skilled in the art that various changes and modifications may be made therein without departing from the spirit or scope of the invention.

We claim:

1. In a hose splice for joining two opposed segments of flexible hose wherein each of the said segments being formed have:

(A) an inner tube of flexible elastomeric material;
(B) an equal number of fabric reinforcing body plies surrounding the inner tube, the exposed end portions of said plies forming a stepped end configuration wherein the radially innermost plies terminate at the shortest distance from the end of the inner tube and each radially outwardly succeeding ply terminates at a distance from the end of the inner tube progressively greater than the ply immediately preceding it;
(C) a cover of flexible material, the end of which terminates at a greater distance from the end of the inner tube than any of the body plies; and
(D) the improved splice comprising
  (1) an outwardly facing tapered surface on the end of the inner tube of one hose segment,
  (2) a mating inwardly facing tapered surface on the end of the inner tube of the other hose segment,
  (3) a strip of elastomeric material between said outwardly and inwardly facing surfaces, with said outwardly and inwardly facing surfaces thereby joined together in face-to-face relationship to form a tapered joint uniting the inner tubes of both hose segments,
  (4) a cover layer of flexible elastomeric material surrounding said tapered joint and extending between the ends of the innermost body ply of each hose segment and substantially coplanar with the outer surface thereof,
  (5) a flexible binder layer surrounding the ends of the outer covers, all the exposed portions of the body plies at the stepped end of each hose segment, and surrounding the cover layer of the tapered joint,
  (6) a plurality of plies of splicing fabric coated with elastomeric material and substantially filling in between the body plies of each hose segment in abutting relation thereto,
  (7) a layer of flexible material covering the entire splice area,
  (8) the beforementioned construction being bonded into an integral structure.

2. A hose splice as claimed in claim 1 wherein each of said outer covers has a generally tapered end and said cover layer has tapered ends which together with the tapered ends of said outer covers form a tapered joint at the junction of each said cover and said layer thereby sealing the outer surface of the splice construction.

References Cited

UNITED STATES PATENTS

| | | | |
|---|---|---|---|
| 1,207,853 | 12/1916 | Burrell | 156—258 X |
| 2,930,406 | 3/1960 | Galloway | 285—55 |
| 3,100,659 | 8/1963 | Rittenhouse | 285—260 |
| 3,342,656 | 9/1967 | Papageorges | 285—260 X |
| 3,388,932 | 6/1968 | Bradley | 285—423 X |

CARL W. TOMLIN, Primary Examiner

DAVE W. AROLA, Assistant Examiner

U.S. Cl. X.R.

138—137; 285—423